United States Patent
Elms et al.

(10) Patent No.: US 10,478,753 B1
(45) Date of Patent: Nov. 19, 2019

(54) APPARATUS AND METHOD FOR TREATMENT OF HYDRAULIC FRACTURING FLUID DURING HYDRAULIC FRACTURING

(71) Applicants: HAVEN TECHNOLOGY SOLUTIONS LLC, Magnolia, TX (US); CH International Equipment Ltd., Lethbridge (CA)

(72) Inventors: David James Elms, Magnolia, TX (US); Gregory Allen Hudspeth, Amarillo, TX (US); Donald Patrick Clark, Lethbridge (CA); James Michael Skow, Lethbridge (CA)

(73) Assignees: CH INTERNATIONAL EQUIPMENT LTD., Lethbridge, Albert (CA); HAVEN TECHNOLOGY SOLUTIONS LLC, Magnolia, TX (US)

( * ) Notice: Subject to any disclaimer, the term of this patent is extended or adjusted under 35 U.S.C. 154(b) by 0 days.

(21) Appl. No.: 16/228,658

(22) Filed: Dec. 20, 2018

(51) Int. Cl.
*B01D 19/00* (2006.01)
*E21B 43/26* (2006.01)

(52) U.S. Cl.
CPC .......... *B01D 19/0057* (2013.01); *E21B 43/26* (2013.01)

(58) Field of Classification Search
CPC .......................... B01D 19/0057; E21B 43/26
See application file for complete search history.

(56) References Cited

U.S. PATENT DOCUMENTS

| | | | |
|---|---|---|---|
| 2,049,578 A | 8/1936 | Werts |
| 2,468,070 A | 4/1949 | Hunter |
| 3,346,117 A | 10/1967 | Page |
| 3,450,264 A | 6/1969 | Graybill |
| 3,543,846 A | 12/1970 | Smith et al. |
| 3,670,507 A | 6/1972 | Mott et al. |
| 4,438,817 A | 3/1984 | Pokladnik et al. |
| 4,474,035 A | 10/1984 | Amin et al. |
| 4,527,632 A | 7/1985 | Chaudot |
| 4,816,044 A | 3/1989 | Weisert et al. |
| 5,004,552 A | 4/1991 | Al Yazdi |
| 5,154,741 A | 10/1992 | da Costa Filho |
| 5,165,450 A | 11/1992 | Marrelli |
| 5,248,421 A | 9/1993 | Robertson |
| 5,286,375 A | 2/1994 | Marrelli |
| 5,431,228 A | 7/1995 | Weingarten et al. |
| 5,707,427 A | 1/1998 | Beck et al. |
| 5,749,945 A | 5/1998 | Beck |
| 6,062,213 A | 5/2000 | Fuisz et al. |
| 6,068,053 A | 5/2000 | Shaw |

(Continued)

FOREIGN PATENT DOCUMENTS

| CN | 106474828 A | 3/2017 |
|---|---|---|
| DE | 3707071 C1 | 8/1988 |

(Continued)

*Primary Examiner* — James G Sayre

(57) ABSTRACT

A hydraulic fracturing system utilizes a multi-phase separation apparatus to separate gas entrained in hydraulic fracturing fluids during the blending process prior to introduction of hydraulic fracturing fluid into high pressure fracturing pumps by directing hydraulic fracturing fluids from a blender through a plurality of loops and thereafter, directing a portion of the separated fluid into a vortex cluster system.

30 Claims, 9 Drawing Sheets

(56) References Cited

U.S. PATENT DOCUMENTS

| | | |
|---|---|---|
| 6,197,095 B1 | 3/2001 | Ditria et al. |
| 6,276,455 B1 | 8/2001 | Gonzalez |
| 6,280,000 B1 | 8/2001 | Zupanick |
| 6,569,323 B1 | 5/2003 | Pribytkov |
| 6,651,745 B1 | 11/2003 | Lush et al. |
| 6,773,605 B2 | 8/2004 | Nyborg et al. |
| 6,857,132 B1 | 2/2005 | Rakib et al. |
| 6,989,103 B2 | 1/2006 | Mohsen et al. |
| 7,006,500 B1 | 2/2006 | Pedersen et al. |
| 7,103,772 B2 | 9/2006 | Jørgensen et al. |
| 7,134,498 B2 | 11/2006 | Hopper |
| 7,152,682 B2 | 12/2006 | Hopper |
| 7,209,442 B1 | 4/2007 | Chapman |
| 7,279,098 B2 | 10/2007 | Freeman |
| 7,314,559 B2 | 1/2008 | Hopper |
| 7,331,396 B2 | 2/2008 | Reimert et al. |
| 7,363,982 B2 | 4/2008 | Hopper |
| 7,497,263 B2 | 3/2009 | Parris et al. |
| 7,532,627 B2 | 5/2009 | Chapman et al. |
| 7,539,208 B2 | 5/2009 | Chapman et al. |
| 7,569,097 B2 | 8/2009 | Campen et al. |
| 7,613,209 B1 | 11/2009 | Nguyen et al. |
| 7,630,361 B2 | 12/2009 | Chapman et al. |
| 7,646,786 B2 | 1/2010 | Droms et al. |
| 7,701,951 B2 | 4/2010 | Chapman et al. |
| 7,720,101 B2 | 5/2010 | Chapman et al. |
| 7,773,594 B2 | 8/2010 | Asati et al. |
| 7,782,898 B2 | 8/2010 | Chapman et al. |
| 7,817,553 B2 | 10/2010 | Parandekar |
| 7,835,274 B2 | 11/2010 | Chapman et al. |
| 7,864,686 B2 | 1/2011 | Chapman et al. |
| 7,865,727 B2 | 1/2011 | Zeng et al. |
| 7,905,946 B1 | 3/2011 | Weislogel et al. |
| 7,957,305 B2 | 6/2011 | Zeng et al. |
| 8,149,833 B2 | 4/2012 | Fox et al. |
| 8,160,098 B1 | 4/2012 | Liu et al. |
| 8,255,682 B2 | 8/2012 | Zeng |
| 8,419,833 B2 | 4/2013 | Elms et al. |
| 8,797,854 B2 | 8/2014 | Bernstein et al. |
| 8,861,546 B2 | 10/2014 | Sheng et al. |
| 9,320,989 B2 | 4/2016 | Elms et al. |
| 9,435,185 B2 | 9/2016 | Wright et al. |
| 9,441,430 B2 | 9/2016 | Selman et al. |
| 9,722,850 B2 | 8/2017 | Bugajski et al. |
| 9,932,732 B1 | 4/2018 | Batten et al. |
| 2002/0052927 A1 | 5/2002 | Park |
| 2002/0067721 A1 | 6/2002 | Kye |
| 2002/0131426 A1 | 9/2002 | Amit et al. |
| 2002/0134546 A1 | 9/2002 | Zupanick |
| 2003/0043802 A1 | 3/2003 | Yazaki et al. |
| 2004/0163129 A1 | 8/2004 | Chapman et al. |
| 2004/0244043 A1 | 12/2004 | Lind et al. |
| 2005/0078699 A1 | 4/2005 | Cummings |
| 2005/0150827 A1* | 7/2005 | Hopper ............... B01D 21/10 210/512.1 |
| 2007/0062863 A1 | 3/2007 | Freeman |
| 2007/0131429 A1 | 6/2007 | Brammer |
| 2008/0017594 A1 | 1/2008 | Sarshar et al. |
| 2008/0210097 A1 | 9/2008 | Washio |
| 2008/0236839 A1 | 10/2008 | Oddie |
| 2009/0025936 A1 | 1/2009 | Donald et al. |
| 2009/0056939 A1 | 3/2009 | Hackworth et al. |
| 2009/0084263 A1 | 4/2009 | Obrejanu |
| 2009/0242197 A1 | 10/2009 | Hackworth et al. |
| 2009/0266550 A1 | 10/2009 | Fenton |
| 2010/0084352 A1 | 4/2010 | Pondelick et al. |
| 2010/0187186 A1 | 7/2010 | Howdeshell et al. |
| 2011/0270431 A1 | 11/2011 | Holley et al. |
| 2012/0152855 A1 | 6/2012 | Lean et al. |
| 2012/0160502 A1* | 6/2012 | Pettigrew ............... E21B 43/26 166/308.3 |
| 2012/0199000 A1 | 8/2012 | Elm et al. |
| 2015/0167415 A1 | 6/2015 | Leuchtenberg |
| 2017/0275521 A1* | 9/2017 | Babcock ............... C09K 8/64 |

FOREIGN PATENT DOCUMENTS

| | | |
|---|---|---|
| DE | 19923901 A1 | 11/2000 |
| EP | 1352679 A1 | 10/2003 |
| EP | 1353038 A1 | 10/2003 |
| EP | 1518595 B1 | 3/2005 |
| FR | 3063912 A1 | 9/2018 |
| GB | 499024 A | 1/1939 |
| GB | 2260087 A | 4/1993 |
| GB | 2553004 A | 2/2018 |
| KR | 101086778 B1 | 6/2011 |
| WO | WO-2005068044 A1 | 7/2005 |
| WO | WO2006020559 A3 | 2/2006 |
| WO | WO-2012040252 A2 | 3/2012 |
| WO | WO-2017100422 A1 | 6/2017 |

* cited by examiner

APPARATUS AND METHOD FOR TREATMENT OF HYDRAULIC FRACTURING FLUID DURING HYDRAULIC FRACTURING

FIELD OF THE INVENTION

The present disclosure generally relates to hydraulic fracturing and more particularly, to preparation of hydraulic fracturing fluids prior to injection of the fluids into a formation. Most particularly, the disclosure relates to use of a multi-phase separation apparatus to remove gas bubbles from hydraulic fracturing fluids prior to introduction of the hydraulic fracturing fluids into high pressure hydraulic fracturing pumps.

BACKGROUND OF THE INVENTION

During hydraulic fracturing operations utilized in production of hydrocarbons, a proppant, such as sand, is blended in a blending unit with one or more liquids, such as water, to form a hydraulic fracturing fluid. Prior to introduction into the blending unit, the liquids themselves may be mixed together in a hydration unit. In both hydration and blending, air bubbles may become entrained in the fluid as a result of the process. In any event, the hydraulic fracturing fluid is then introduced into a wellbore under high pressure in order to promote production of hydrocarbons from a formation. To achieve the fluid pressures necessary for such an operation, high pressure pumps are utilized to pump the hydraulic fracturing fluid into the formation. These high-pressure pumps include internal components such as pistons or impellers designed to withstand proppant entrained in the hydraulic fracturing fluid. In particular, these internal pump components are designed to withstand the impact of proppant on the internal components. For this reason, heretofore, it was believed that the pistons, impellers and the like would similarly withstand the impact of entrained gas, such as air bubbles, on the internal components. However, it has been found that unlike the proppant entrained in the hydraulic fracturing fluid, gas bubbles are significantly more harmful to these internal pump components, causing cavitation that erodes the components, which can decrease pump performance, increase pump maintenance and shorten the operational life of the components.

BRIEF DESCRIPTION OF THE DRAWINGS

A more complete understanding of the present disclosure and advantages thereof may be acquired by referring to the following description taken in conjunction with the accompanying figures, wherein.

DETAILED DESCRIPTION

In the detailed description of the invention, like numerals are employed to designate like parts throughout. Various items of equipment, such as pipes, valves, pumps, fasteners, fittings, etc., may be omitted to simplify the description. However, those skilled in the art will realize that such conventional equipment can be employed as desired.

Figure 1:
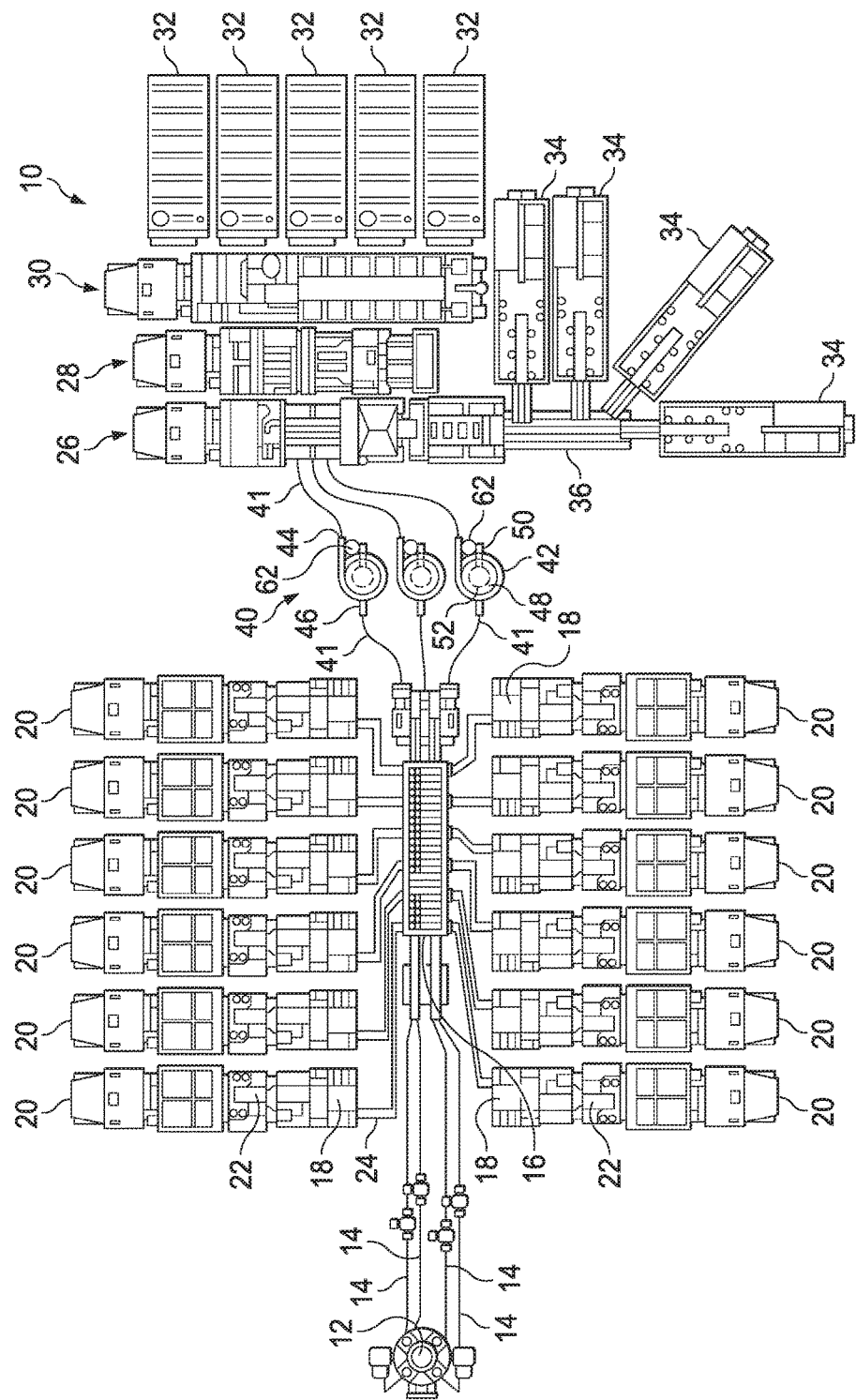
FIG. 1 is a plan view of one embodiment of a hydraulic fracturing pad in accordance with the disclosure.

Generally, a hydraulic fracturing system is provided and may include a liquid source, an additive source, a blender, a high-pressure pump, a hydration unit and a two-phase flow separator system disposed inline between the blender and the high-pressure pump. In some embodiments, the two-phase flow separator system employs a curvilinear flow line system in combination with a fluid vessel to improve operation of the curvilinear flow line system, separating a two-phase fluid into a primarily liquid component and a primarily gaseous component. In one or more embodiments, the curvilinear flow line system is disposed around the outer perimeter of the fluid vessel, while in other embodiments, the curvilinear flow line system is disposed within the interior of the vessel. In one or more embodiments, a vortex cluster system may be utilized to treat the primarily gaseous gas component downstream of the curvilinear flow line system. The vortex cluster system may be positioned within the interior of a tank, while in other embodiments, the vortex cluster system may be external to a tank. In yet other embodiments, a curvilinear flow line system may be combined with the vortex cluster system of the disclosure without any tank. In this regard, in some embodiments, the vortex cluster system on its own may be a two-phase flow separator system. Turning to FIG. 1, a plan view of a hydraulic fracturing pad 10 illustrates equipment utilized in a hydraulic fracturing operation. A wellhead 12 is connected through flow lines 14 to a fracturing manifold 16. The fracturing manifold 16 is in fluid communication with a plurality of hydraulic fracturing pumps 18 mounted to pump trailers 20. In some embodiments, the pump trailers 20 may be trucks having two or more axles. In some embodiments, the pumps 18 may be powered by electric motors 22, which can also be mounted to the pump trailers 20. As shown, the pump trailers 20 can be positioned near the manifold 16 to connect fracturing fluid lines 24 between the pumps 18 and the manifold 16. The manifold 16 is then connected to the wellhead 12 and configured to deliver fracturing fluid provided by the pumps 18 to the wellhead 12. The fracturing pumps 18 receive a fracturing liquid or slurry from a blender 26. In particular, the pumps 18 may include a pump inlet that is in fluid communication with the outlet of blender 26. Manifold 16 may be utilized to deliver lower pressure fracturing fluid to pumps 18 from blender 36 and/or to deliver high pressure fracturing fluids from pumps 18 to wellhead 12. A hydration source 28, a chemical source 30 and a fluid storage tank 32 may deliver fluids, such as water, chemicals and gels, to the blender 26. Likewise, proppant, such as sand or other materials, may be stored in solid storage container 34 and delivered to blender 26 via conveyors 36. Blender 26 is configured to mix and blend the components of the hydraulic fracturing fluid, and to supply the hydraulic fracturing fluid to the pumps 18. In some embodiments, certain chemicals, such as acid, can also be drawn directly from chemical source 30 by a pump 18 without using blender 26. As described herein, blender 26 is not limited to any particular type of blender, but may be any type of blender used in hydraulic fracturing operations to blend a fluid, such as water, and a solid, such as proppant. Hydraulic fracturing pump 18 is not limited to any particular type of pump, and may be any type of pump utilized to pump a blended hydraulic fracturing fluid into a wellbore. In some embodiments, hydraulic fracturing pump 18 may be a high pressure pump with operating pressures of 7000 psi or higher, while in other embodiments the hydraulic fracturing pump 18 may have operating pressures of 10,000 psi or higher. In some embodiments, hydraulic fracturing pump 18 may be a high pressure pump with operating pressures of approximately 15,000 psi. In some embodiments, hydraulic fracturing pump 18 may be a high pressure pump with operating pressures in a range of approximately 7000-15,000 psi.

Disposed between the blender 26 and the pumps 18 are one or more two-phase flow separator systems 40. While three flow separator systems 40 are illustrated, any number of flow separator systems 40 may be utilized as required for a particular operation. In some embodiments, flow separator systems 40 may be mounted on a truck, a trailer, a skid or free-standing. In the illustrated embodiment, flow separator system 40 is shown fluidically connected in-line along flow line 41 between the blender 26 and the fracturing manifold 16. Flow separator system 40 generally includes a curvilinear flow line 42 having an inlet 44 in fluid communication with the blender 26 to deliver fracturing fluid to flow separator system 40 and an outlet 46 directly or indirectly in fluid communication with pump(s) 18. Curvilinear flow line 42 is disposed about a vessel 48 forming a component of flow separator system 40. A riser 50 delivers gaseous fluid removed from the fracturing fluid by curvilinear flow line 42 into vessel 48. Flow separator system 40 may include a vortex cluster system 52. Flow separator system 40 may further include an air relief mechanism 62 for maintaining a desired liquid level within vessel 48. In the illustrated embodiment, the one or more flow separator systems 40 are disposed upstream of manifold 16 so as to service a large plurality of downstream pumps 18 utilizing one or a small plurality of flow separator systems 40. In some embodiments, or more flow separator systems 40 may be separately dedicated to a chemical unit 30 where a pump 18 is drawing chemicals directly from chemical unit 30 so as to bypass blender 26, thereby removing gas from any liquid chemicals prior to introduction of the chemicals into pump 18.

Figure 2:
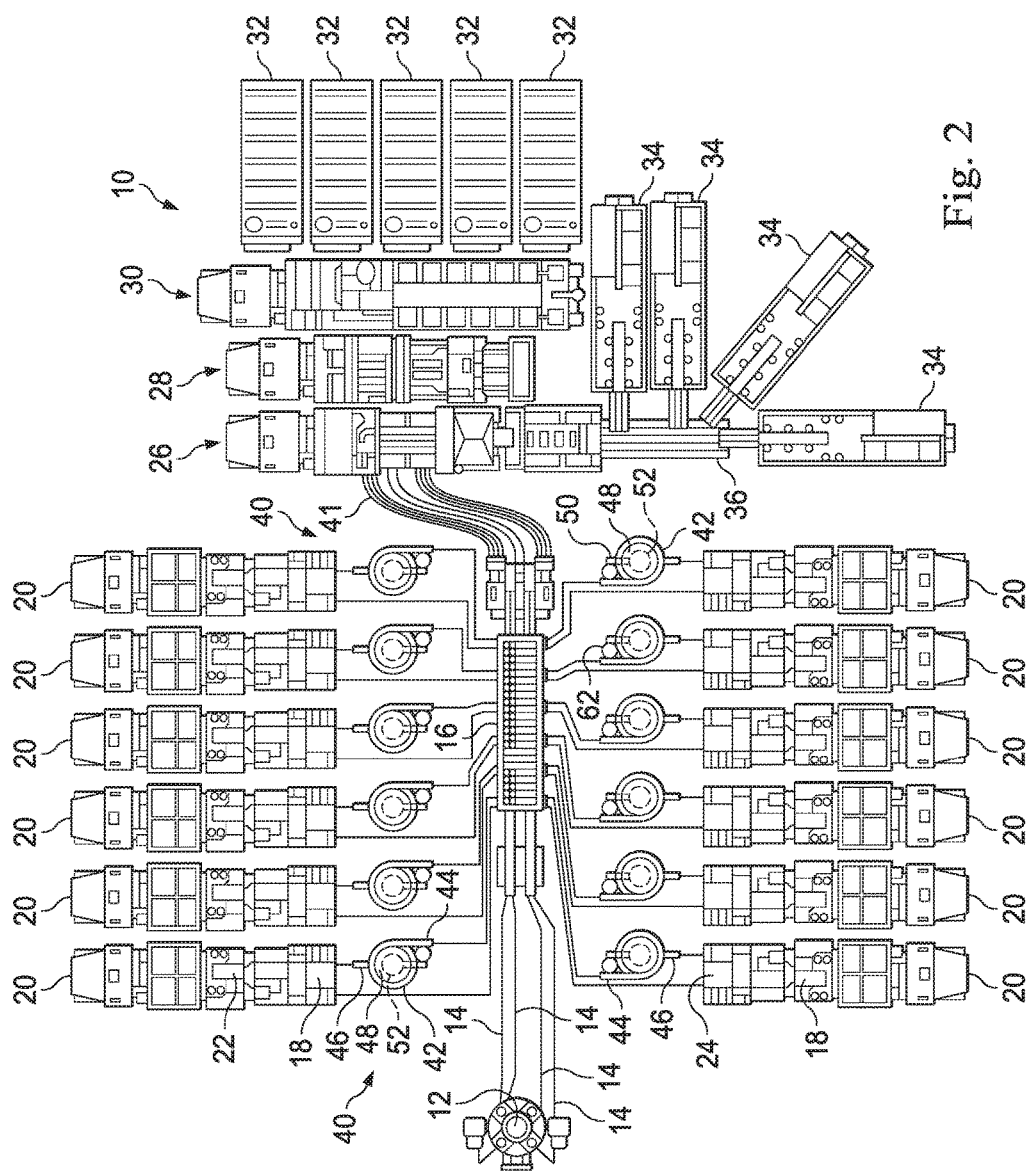
FIG. 2 is a plan view of another embodiment of a hydraulic fracturing pad in accordance with the disclosure.

FIG. 2 is a plan view similar to FIG. 1, but illustrates flow separator systems 40 being deployed in line between the fracturing manifold 16 and the high pressure pumps 18. In the illustrated embodiment, as in FIG. 1, a wellhead 12 is connected through flow lines 14 to a fracturing manifold 16. The fracturing manifold 16 is in fluid communication with a plurality of pumps 18 mounted to pump trailers 20. The manifold 16 is then connected to the wellhead 12 and configured to deliver fracturing fluid provided by the pumps 18 to the wellhead 12. The fracturing pumps 18 receive a fracturing liquid or slurry from a blender 26 via manifold 18. A hydration unit 28, a chemical unit 30 and a fluid storage tank 32 may deliver fluids, such as water, chemicals and gels, to the blender 26. Likewise, proppant, such as sand or other materials, may be stored in sand storage containers 34 and delivered to blender 26 via conveyors 36. Blender 26 is configured to mix and blend the components of the hydraulic fracturing fluid, and to supply the hydraulic fracturing fluid to the pumps 18.

Disposed between the fracturing manifold 16 and the pumps 18 are one or more two-phase flow separator systems 40. Although one flow separator system 40 may be utilized to deliver low pressure fracturing fluid to multiple pumps 18, in the illustrated embodiment, a two-phase flow separator system 40 is deployed for each pump 18. In some embodiments, flow separator system 40 may be mounted on a truck, a trailer, a skid or free-standing.

Similar to FIG. 1, flow separator system 40 shown in FIG. 2 generally includes a curvilinear flow line 42 having an inlet 44 in fluid communication with the blender 26 to deliver fracturing fluid to flow separator system 40 and an outlet 46 directly or indirectly in fluid communication with pump(s) 18. Curvilinear flow line 42 is disposed about a vessel 48 forming a component of flow separator system 40. A riser 50 delivers gaseous fluid removed from the fracturing fluid by curvilinear flow line 42 into vessel 48. Flow separator system 40 may include a vortex cluster system 52. Flow separator system 40 may further include an air relief mechanism 62 for maintaining a desired liquid level within vessel 48.

Figure 3:
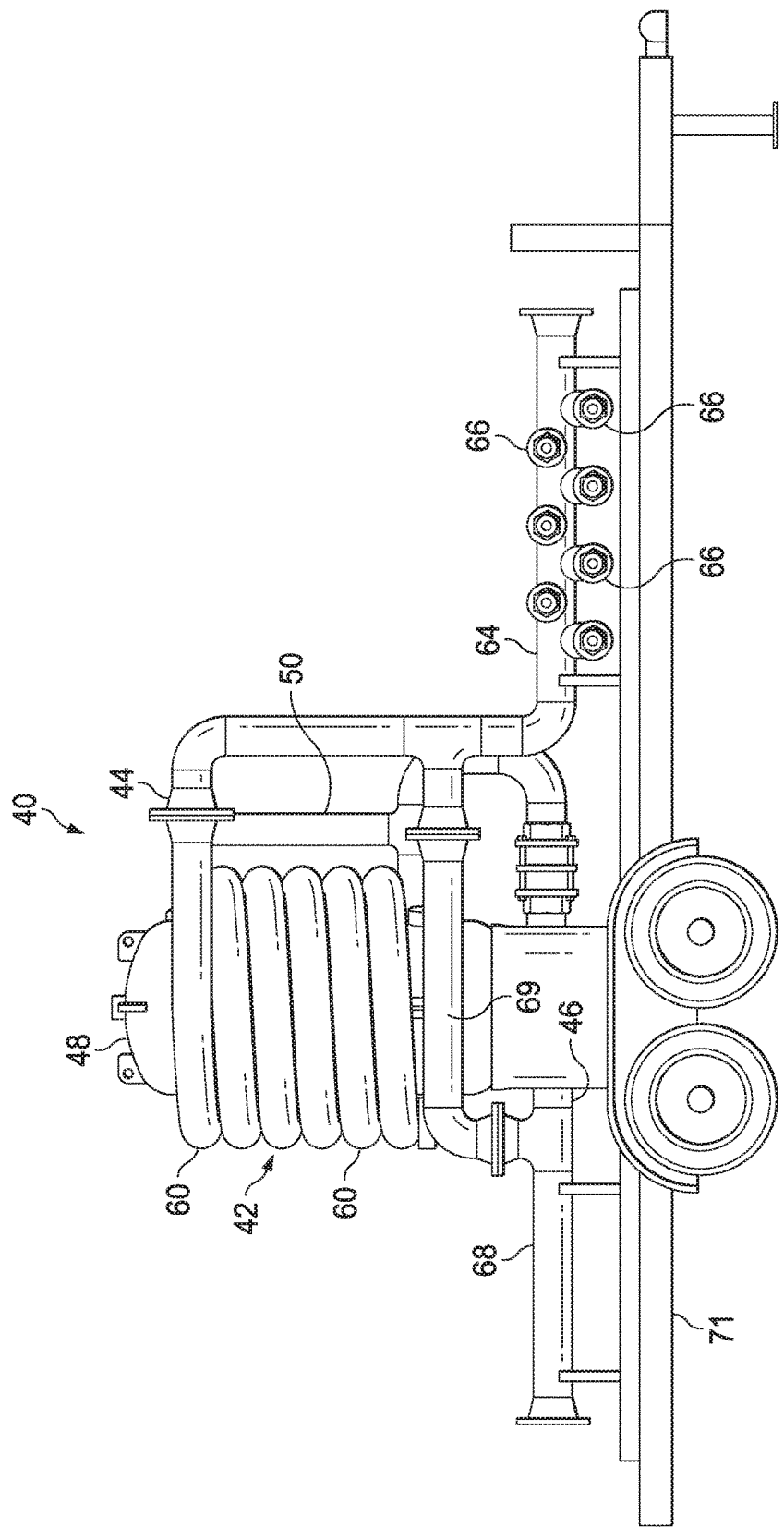
FIG. 3 is a perspective view of a two-phase flow separator system utilized in a hydraulic fracturing pad.
Figure 4:
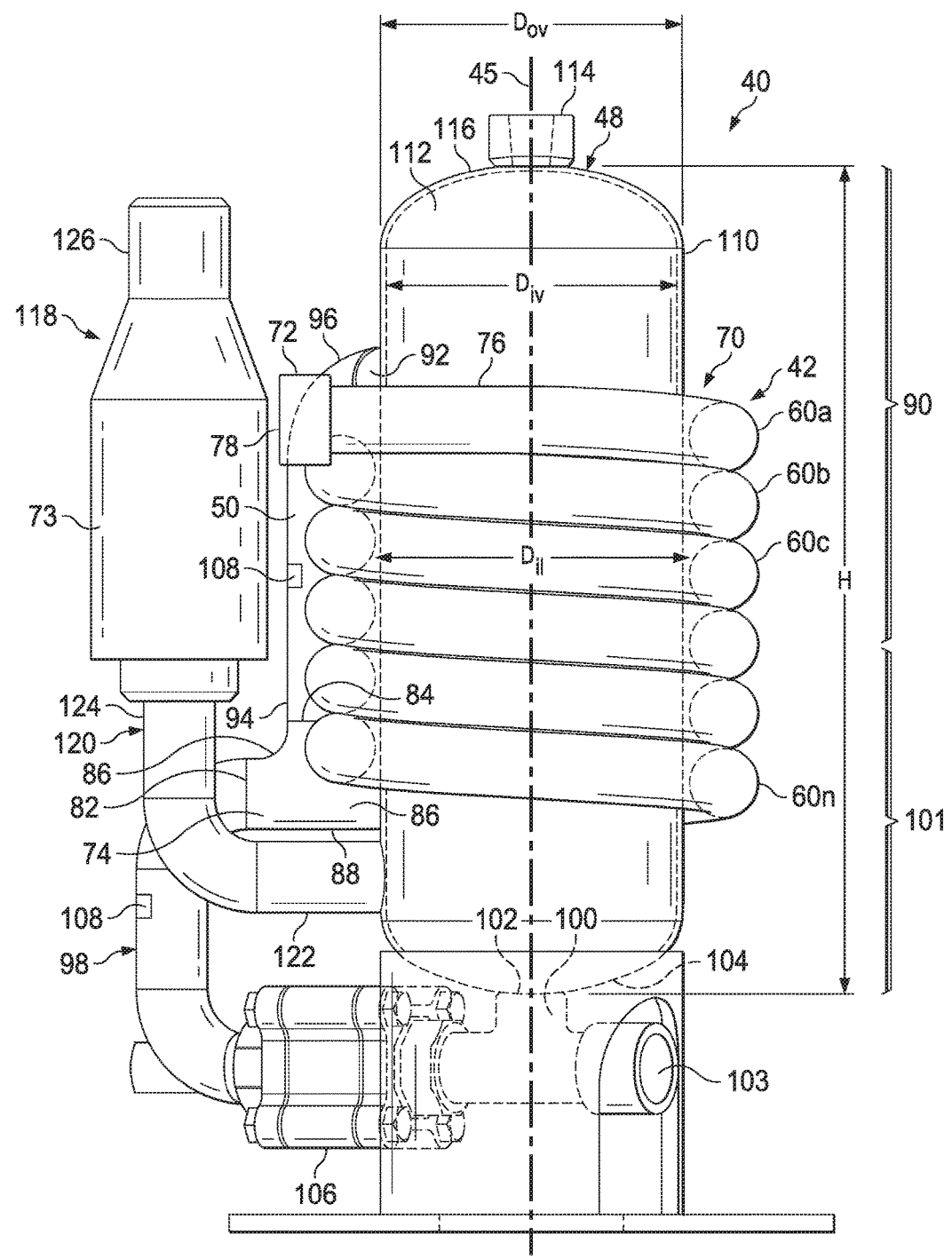
FIG. 4 is an elevation view of a two-phase flow separator system of the disclosure employing a separation tank and backflow valve to optimize separation.

FIG. 3 illustrates flow separator system 40 in greater detail. Specifically, curvilinear flow line 42 is shown as including a plurality of horizontally oriented, vertically stacked loops 60 disposed around vessel 48. Inlet 44 of curvilinear flow line 42 is in fluid communication with an inlet manifold 64, which includes a plurality of inlets 66. Similarly, an outlet manifold 68 is illustrated in fluid communication with outlet 46 of flow separator system 40. Riser 50 delivers gaseous fluid removed from stacked loops 60 into vessel 48. A bypass flow line 69 may extend between inlet manifold 64 and outlet manifold 68. In the illustrated embodiment, flow separator system 40 is shown as mounted on a trailer 71 enabling flow separator system 40 to be readily moved about a hydraulic fracturing pad 10 (see FIG. 1). It will be appreciated that availability of space at "A" hydraulic fracturing pad may be very limited and that the flow separator system 40 of the disclosure, with components sized and arranged as described, is very compact and easily transportable, making it ideal for utilization on pad sites with limited space availability. With reference to FIG. 4, one embodiment of a two-phase flow separator system 40 is illustrated. As used herein, "two-phase" refers to a fluid with at least one gaseous component and at least one liquid component, although the fluid may have more than one gaseous or liquid component. A curvilinear flow line 42 is disposed around the outer periphery of a fluid vessel 48 which fluid vessel 48 is formed along a substantially vertical axis 15. The curvilinear flow line 42 has a first pipe 70 having a first end 72 and a second end 74. Between first end 72 and second end 74, pipe 70 forms a plurality of curvilinear pipe loops 60a, 60b, 60c . . . 60n arranged adjacent one another about substantially vertical axis 15. In the illustrated embodiment, six loops 60 are shown, however, a fewer or greater number of loops 60 may be utilized, although at least two loops are preferable. In one or more embodiments, at least a portion of the curvilinear pipe loops 60 are of the same diameter and the pipe loops 60 are adjacent one another in a vertically stacked arrangement such that each curvilinear pipe loop 60 is substantially horizontal. In any event, first pipe 70 may include a substantially horizontal portion 76 at the first end 72 terminating in an inlet 78. Similarly, first pipe 70 may include a substantially horizontal portion 80 at the second end 74 terminating in a liquid outlet 82. In one or more embodiments, the first end 72 is positioned above the second end 74 relative to vertical axis 15. As such, pipe loops 60 are descending in that fluid flow from first end 72 to second end 74 flows downward. In addition, a gas outlet port 84 is disposed along the first pipe 70 along the horizontal portion 80. The gas outlet port 84 is preferably disposed along the upper pipe surface 86 of the horizontal portion 80. Gas outlet port 84 and liquid outlet 82 may be adjacent one another such that horizontal portion 80 forms a "T" junction 88 along pipe 70.

Extending upward from gas outlet port 84 is a riser 50. In one or more embodiments, riser 50 is in fluid communication with fluid vessel 48 such that fluid vessel 48 functions as a gas separator into which fluid (typically wet gas) flowing up along riser 50 can be collected. In this regard, riser 50 is in fluid communication with an upper portion 90 of fluid vessel 48 via a port 92 in fluid communication with the upper portion 90. More specifically, riser 50 may be substantially vertical and may be substantially parallel with vertical axis 15. Riser 50 may have a first lower end 94 in fluid communication with the gas outlet port 84 and a second upper end 96 in fluid communication with fluid vessel 48. In this regard, riser 50 may be in fluid communication with an upper portion 90 of fluid vessel 48.

A liquid flow line 98 extends from liquid outlet 82. Liquid flow line 98 includes a first outlet 100 in fluid communication with a lower portion 101 of vessel 48, and a second outlet 103, downstream of first outlet 100. First outlet 100 may be in fluid communication with a liquid port 102 located in the bottom or lowest end 104 of vessel 48.

In one or more embodiments, a backpressure device 106 may be positioned along liquid flowline 98 upstream of the first outlet 100, between outlet 82 of first pipe 70 and first outlet 100 of flowline 98. Backpressure device 106 may be any mechanism which can be actuated as desired to adjust or regulate the pressure of the fluid flowing along liquid flow line 98, including without limitation a valve, such as a mechanical valve or an automated valve. In this regard, a sensor 108 may be provided to measure a condition of the fluid flowing along either riser 50 or liquid flow line 98 or both, which sensor(s) 108 may be utilized to adjust backpressure device 106 to optimize two-phase separation as described. In particular, it will be appreciated that backpressure device 106 impedes or slows the flow out of liquid through outlet 82 of first pipe 70 in order to create a wave of liquid within first pipe 70 downstream of gas outlet port 84 which enhances flow of the separated primarily gaseous component into riser 50.

As described above, fluid vessel 48 is generally formed along a substantially vertical axis 15 and has a vessel wall 110 defining a vessel interior 112. In the depicted embodiment, vessel 48 has a vessel height H and vessel wall 110 defines an outer vessel diameter $D_{ov}$ and an inner vessel diameter $D_{iv}$. In the illustrated embodiment, vessel 48 is elongated along axis 15, such that height H is greater than outer vessel diameter $D_{ov}$. However, in other embodiments, outer vessel diameter $D_{ov}$ may be greater than height H. In any event, in this embodiment of two-phase flow separator system 40, pipe loops 60 are arranged about the exterior of vessel 48 adjacent wall 110. Thus, pipe loops 60 may have an inner loop diameter $D_{al}$ which is slightly larger than outer vessel diameter $D_{ov}$. In addition to the liquid port 102 located in the bottom or lowest end 104 of vessel 48, a gas port 114 may be disposed in the top or upper end 116 of vessel 48.

In one or more embodiments, pipe loops 60 extend along vertical axis 15 for only a portion of the height H of fluid vessel 48. In this regard, the lowest pipe loop 60*n* is spaced apart above the bottom or lowest end 104 of vessel 48 so as to permit a portion of liquid flowing through liquid flow line 98 to be charged back into vessel 48 as desired.

One advantage to the above-described configuration of pipe loops 60 disposed in conjunction with fluid vessel 48 as described above, is the effects that gas collected in the upper portion 90 of fluid vessel 48 has on hammering or compression fluid downstream of outlet 103. Specifically, the collected gas dampens downstream fluid flow and in particular, fluid pulses that may arise in the fluid flow. In this regard, in some embodiments, two-phase flow separator system 40 may further include an air relief mechanism 118 to maintain a select fluid level within fluid vessel 48. Specifically, a standpipe 120 having a first end 122 in fluid communication with the lower portion 101 of fluid vessel 48 and a substantially vertical second end 124 in fluid communication with an air relief vessel 73 having a gas outlet port 126 at an upper end thereof. It will be appreciated by adjusting the length of the substantially vertical second end 124 of standpipe 120, and adjusting the pressure of gas within air relief vessel 73, the liquid level (not shown) within fluid vessel 48, and hence the gas volume within fluid vessel 48 can be adjusted. In alternative embodiments, air relief mechanism 118 may be replaced with an automated control system to maintain a desired fluid level within fluid vessel 48. In either case, it has been found that by maintaining a desired fluid level, such as a constant fluid level, within fluid vessel 48, downstream effects of flow rates into vessel 48 are dampened. In other words, air relief mechanism 118 functions as a fluid dampener to mitigate against the downstream effects on pumps 18 (see FIG. 1) of fluctuations in hydraulic fracturing fluids pumped from blender 26 (see FIG. 1). Specifically, changes in the flow rate that could result in a kick experienced by downstream equipment, such as pumps, are mitigated by air relief mechanism 118 in order to achieve a more constant flow rate downstream. In other embodiments, air relief mechanism 118 may be incorporated within vessel 48, such as a gas bladder (not shown) or similar device.

In operation, as described above, it has been found that the operational life and efficiency of hydraulic fracturing pumps can be extended or improved by removing gas entrained in the hydraulic fracturing fluid during mixing. As such, a method of hydraulic fracturing of a wellbore generally includes introducing a fluid into a blender and utilizing the blender to mix the fluid with an additive, such as a chemical or proppant, introduced into the blender to yield a hydraulic fracturing fluid or slurry. The additive may be a solid, such as proppant, or another liquid, such as a chemical. It will be appreciated that the mixing process by the blender often results in the introduction of gas, typically in the form of air bubbles, into the hydraulic fracturing fluid. As described herein, it is desirable to remove the gas from the mixed hydraulic fracturing fluid before introducing the hydraulic fracturing fluid into the hydraulic fracturing pumps. Thus, the resulting hydraulic fracturing fluid from the blender is introduced into the two-phase flow separator system before passing the hydraulic fracturing fluid to the hydraulic fracturing pumps. In the two-phase flow separator system, the hydraulic fracturing fluid is directed downward through a plurality of descending curvilinear loops to stratify the hydraulic fracturing fluid into a first fluid component comprising primarily a gas phase and a second fluid component comprising primarily a liquid phase. Once stratified, then the first fluid component can be removed from the stratified hydraulic fracturing fluid through the riser described above. Thereafter, the second fluid component can be directed into a hydraulic fracturing pump, the second fluid component comprised of liquid and additive, with gas introduced by the hydration and blending process removed.

As used herein, a two-phase stream refers to a fluid stream having both a liquid component and a gaseous component. The liquid component may further include a solid component, such as proppant carried therein, or another liquid component, but the focus of the two-phase flow separator system 40 is to separate the gaseous component from the liquid component and any chemical additive or proppant carried by the liquid component. As used herein, "proppant" is not limited to a particular type of solid additive, and may include any proppant known in the industry. More specifically, the two-phase fluid stream from the hydraulic fracturing blender is introduced into first pipe 70 via inlet 78. The two-phase fluid stream is directed into a curvilinear flow line 42 formed by the plurality of curvilinear pipe loops 60. In one or more embodiments, the curvilinear pipe loops 60 are descending from inlet 78 adjacent an upper portion 90 of vessel 48 downward relative to substantially vertical axis 15 of fluid vessel 48 to outlet 74 adjacent the lower portion 101 of vessel 48. Loops 60 create an increased distribution of a first fluid component comprising primarily gas, along the inner perimeter of each loop 60, while the relatively heavier and denser second fluid component comprising primarily liquid and additive is forced to the outer perimeter of each loop due to centrifugal force of curvilinear flow path, thus creating a high concentration of gas along the inner perimeter of loops 60 closest to vessel 48. With two-phase fluid stream forming a more stratified flow regime, or at least the distribution or volume of gas near the inner perimeter of curvilinear flow line 42, the substantially gaseous fluid flow may be effectively separated at gas outlet port 84 from the substantially liquid fluid of the second fluid component passing through horizontal portion 80 of first pipe 70.

The separated first fluid component is thus comprised primarily of gas with a low percentage of liquid entrained therein. This first fluid component, in the form of "wet gas", may then be directed into a conventional gas-liquid separator, such as vessel 48.

In any case, once gas has been removed from the hydraulic fracturing fluid stream by the two-phase flow separator system 40, the remaining fluid stream, namely the second fluid component, is directed to the hydraulic fracturing pump.

Figure 5:
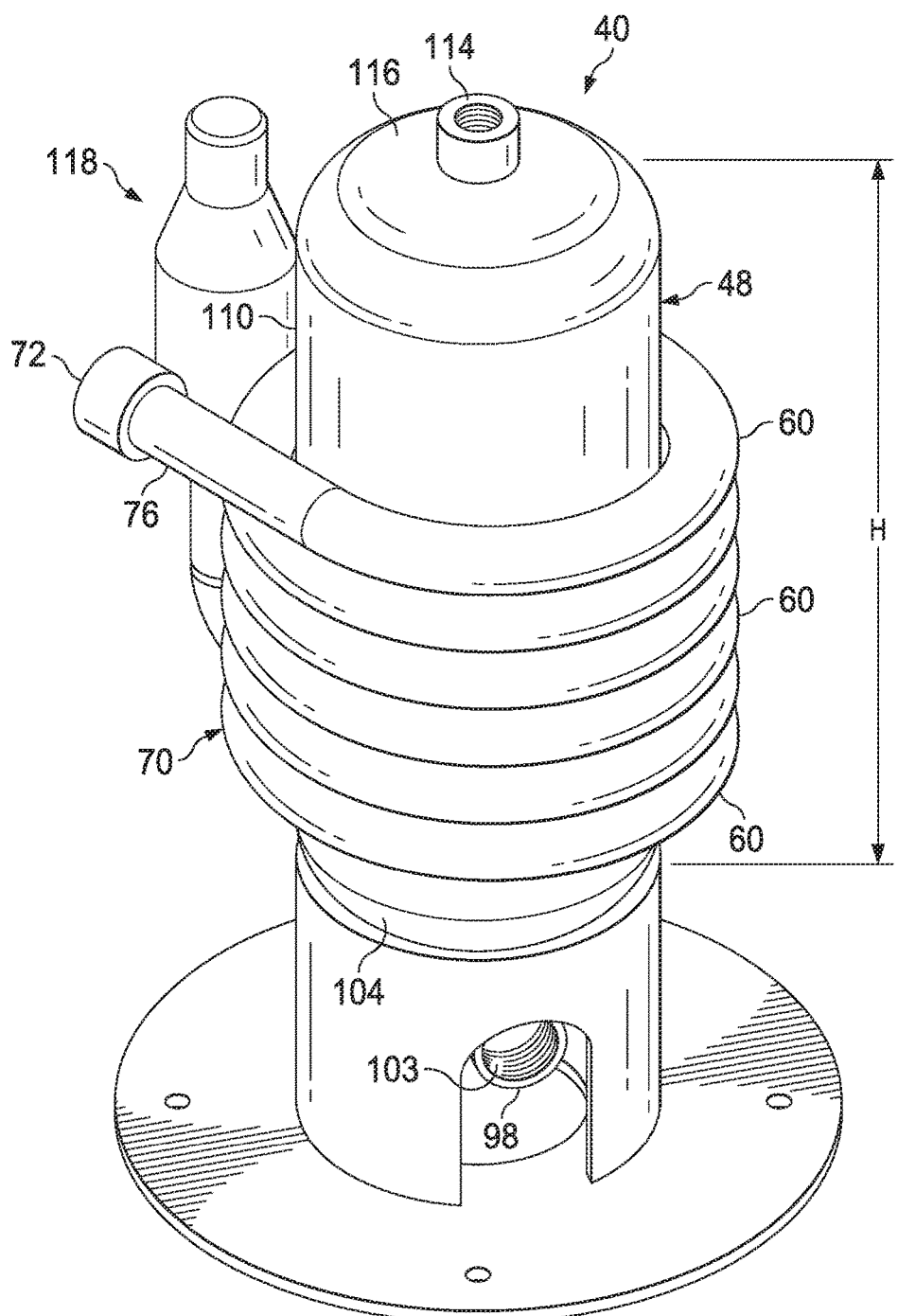
FIG. 5 is a perspective view of the flow separator system of FIG. 4.

FIG. 5 is a perspective view of the two-phase flow separator system 40 described in FIG. 4. As shown, a portion of the height H of fluid vessel 48 is wrapped by a plurality of pipe loops 60 forming first pipe 70 extending from a first end 72. A liquid flow line 98 having a second outlet 103 extends under vessel 48 to allow liquid flow line 98 to be in fluid communication with a lower end 104 of vessel 48. An air relief mechanism 118 may be utilized to maintain the liquid (not shown) within vessel 48 at a desired level. Vessel also includes a gas port 114 at its upper end 116 for release of gas captured within vessel 48.

Figure 6:
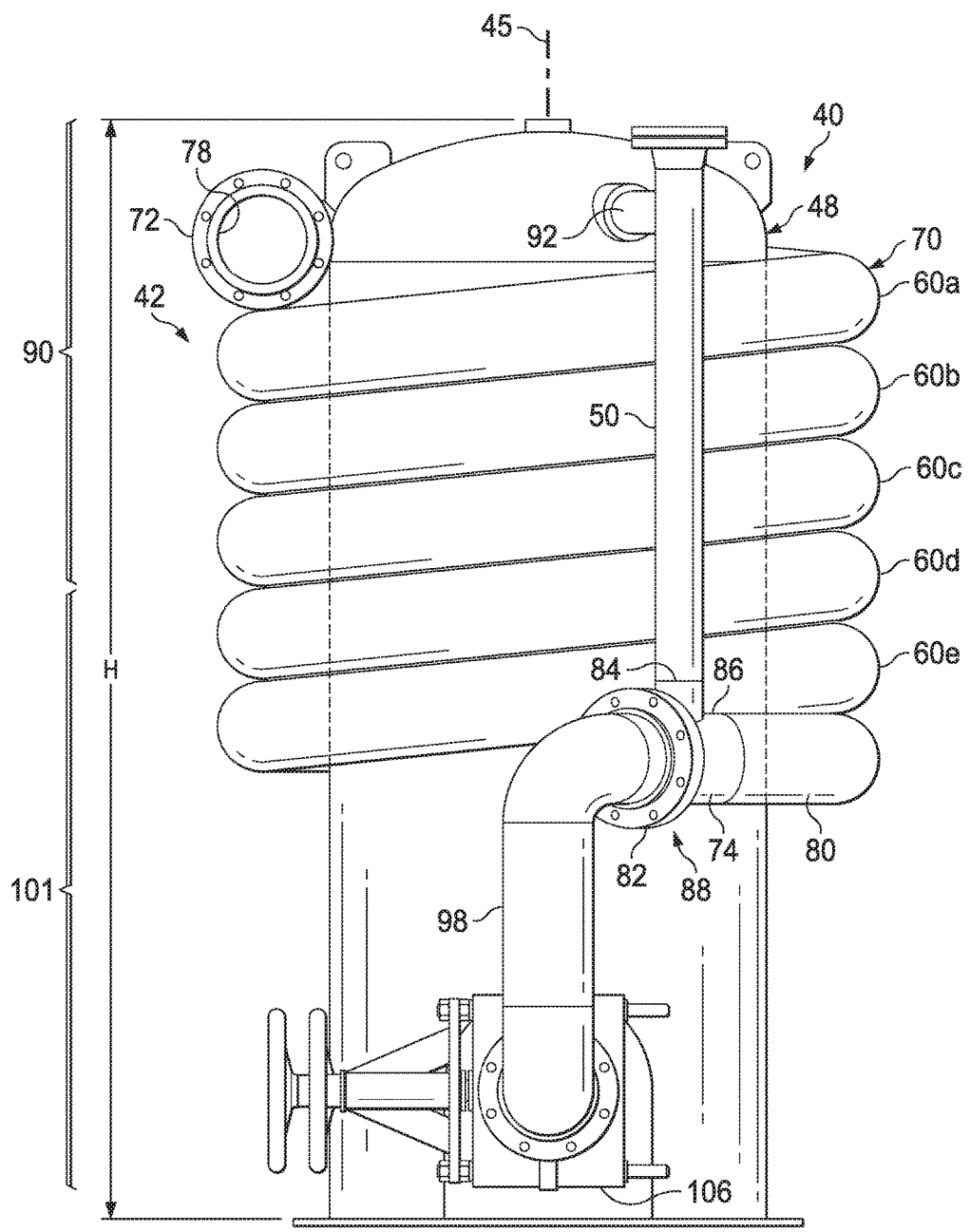
FIG. 6 is an elevation view of another embodiment of a two-phase flow separator system of the disclosure employing a separation tank.

FIG. 6 is a perspective view of another embodiment of two-phase flow separator system 40, but without the air relief mechanism 118 of FIGS. 4 and 5. As shown, a portion of the height H of fluid vessel 48 is wrapped by a plurality of pipe loops 60 forming first pipe 70.

More specifically, the curvilinear flow line 42 includes a first pipe 70 having a first end 72 and a second end 74. Between first end 72 and second end 74, first pipe 70 forms a plurality of curvilinear pipe loops 60a, 60b, 60c . . . 60n arranged adjacent one another about substantially vertical axis 15. In any event, first pipe 70 may include an inlet 78. Similarly, first pipe 70 may include a substantially horizontal portion 80 at the second end 74 terminating in a liquid outlet 82. In addition, a gas outlet port 84 is disposed along the first pipe 70 along the horizontal portion 80. The gas outlet port 84 is preferably disposed along the upper pipe surface 86 of the horizontal portion 80. Gas outlet port 84 and liquid outlet 82 may be adjacent one another such that horizontal portion 80 form a "T" junction 88 along pipe 70.

Extending upward from gas outlet port 84 is a riser 50. In one or more embodiments, riser 50 is in fluid communication with fluid vessel 48 such that fluid vessel 48 functions as a gas separator into which fluid flowing up along riser 50 can be collected. In this regard, riser 50 is in fluid communication with an upper portion 90 of fluid vessel 48 via port 92.

A liquid flow line 98 extends from liquid outlet 82. Liquid flow line 98 may pass under fluid vessel 48.

In one or more embodiments, a backpressure device 106 may be positioned along liquid flowline 98 to enhance extraction of wet gas at gas port 84.

Figure 7:
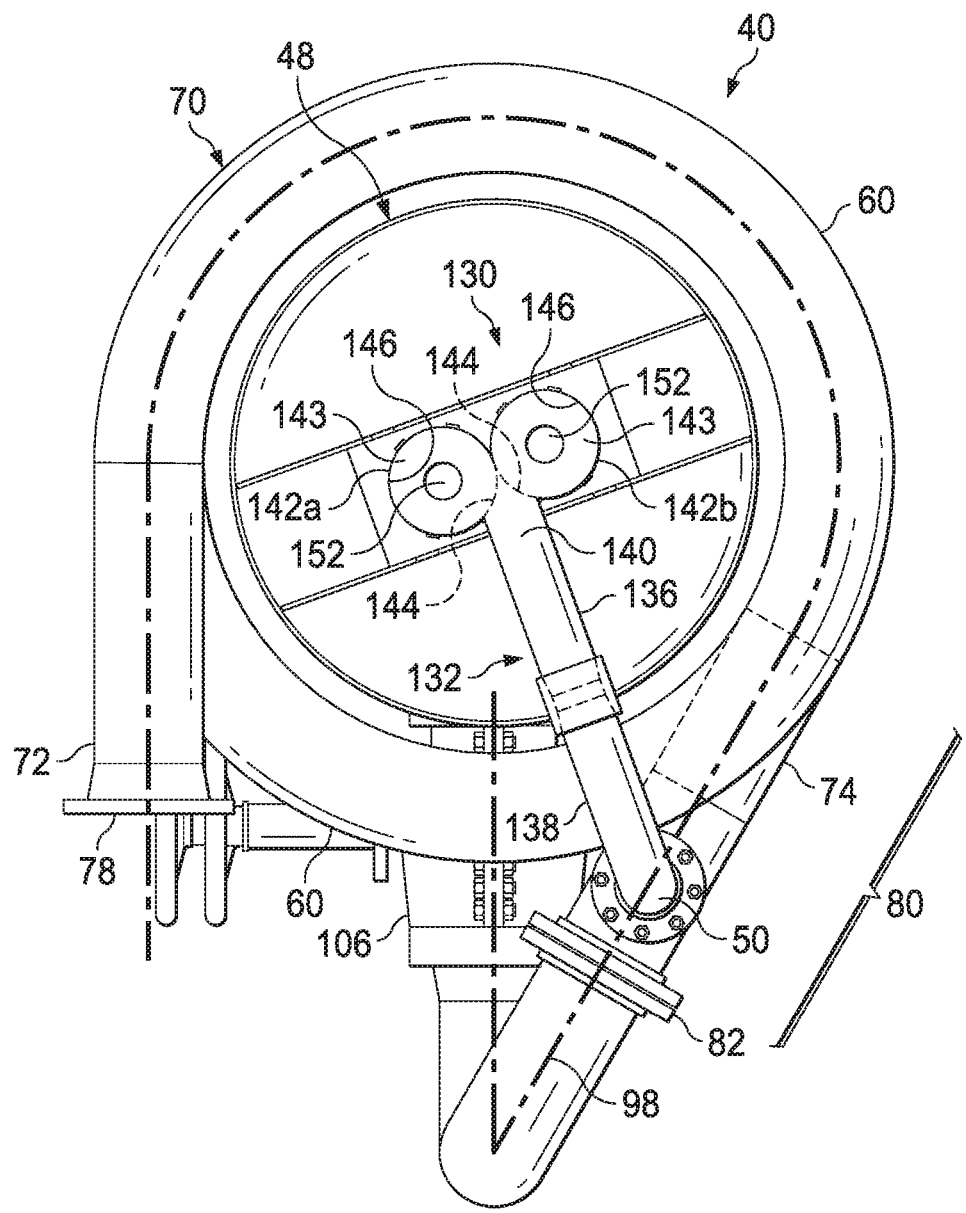
FIG. 7 is cut-away top view of another embodiment of a two-phase flow separator system, in which a curvilinear flow line system is combined a vortex cluster system.

With reference to FIG. 7, another embodiment of a two-phase flow separator system 40 is shown. In this embodiment, the two-phase flow separator system 40 is similar to FIGS. 4, 5 and 6, but further includes a vortex cluster system 130 disposed within vessel 48. Specifically, rather than simply delivering a fluid flow into an upper portion 90 of vessel 48, riser 50 is in fluid communication with a vortex cluster system 130. In any event, shown in FIG. 7 is first pipe 70 wrapped around fluid vessel 48 to form a plurality of pipe loops 60 along at least a portion of the height H (see FIG. 6) of fluid vessel 48. First pipe 70 has a first end 72 and a second end 74. First pipe 70 includes an inlet 78. First pipe 70 may include a substantially horizontal portion 80 at the second end 74 terminating in a liquid outlet 82. Extending upward from second end 74 is a substantially vertical riser 50. In one or more embodiments, riser 50 is in fluid communication with fluid vessel 48 such that fluid vessel 48 functions as a gas separator into which fluid flowing up along riser 50 can be collected. In some embodiments, the vortex cluster system 130 is disposed in the upper portion 90 (see FIG. 6) of fluid vessel 48.

In some embodiments, such as illustrated in FIG. 7, vortex cluster system 130 may include a fluid injection conduit 132 forming a channel 136 having a first end 138 in fluid communication with riser 50 and a second end 140 terminating adjacent at least one vertically positioned vortex tube 142 extending down into vessel 48. In the illustrated embodiment, at least two vortex tubes 142a, 142b are illustrated. In one or more embodiments with two or more tubes 142, tubes 142 may be positioned on opposing sides of channel 136. Each vortex tube 142 has a first upper end 143 and a second lower end 145, with an opening 144 in a portion of the cylindrical, vertical sidewall 146 forming the tube 142, so that opening 144 functions as an inlet with a leading edge 148 and a trailing edge 150 (see FIG. 9). First upper end 145 of the tube 142 adjacent the opening 144 may include a gas port 152 and a second lower end 145 of the tube 142 may be open. In one or more embodiments, the leading edge 148 is approximately parallel with the channel 136 at the point of intersection between the channel 136 and the vortex tube 142. In other words, the channel 136 intersects the vortex tube 142 at the leading edge 148 so as to be generally tangential to the vortex tube 142 at the point of intersection with the leading edge 148. Wet gas under pressure flows along conduit 132 and enters each tube 142 through its corresponding inlet 144 at an upper end of the vortex tube 142, entering the vortex tube 142 tangentially— that is, at a tangent to the internal cylindrical wall 146 of each of the vortex tube 142. A vortex tube 142 functions to separate an immiscible liquid component from a wet gas stream by utilizing centrifugal force. Wet gas enters fluid injection conduit 132, flows along channel 136 and through opening 144 into the interior of the vortex tube 142 tangentially so that the fluids swirl at a rapid rate within the vortex tube 142. The swirling gas causes entrained liquids to be expelled and to encounter the vortex tube 142 internal cylindrical wall 146 where the liquids accumulate and fall downwardly by gravity to ultimately flow out of the vortex tube 142 into vessel 48. The swirling gas component of the fluid stream having substantially less density than the entrained liquid component migrates to the axial center of each vortex tube 142 and flows out through the upper gas port 152. While vortex tubes 142 are generally described as straight tubes, in other embodiments, vortex tubes 142 may be tapered to gradually narrow or gradually expand along the length of the tube 142.

Figure 8:
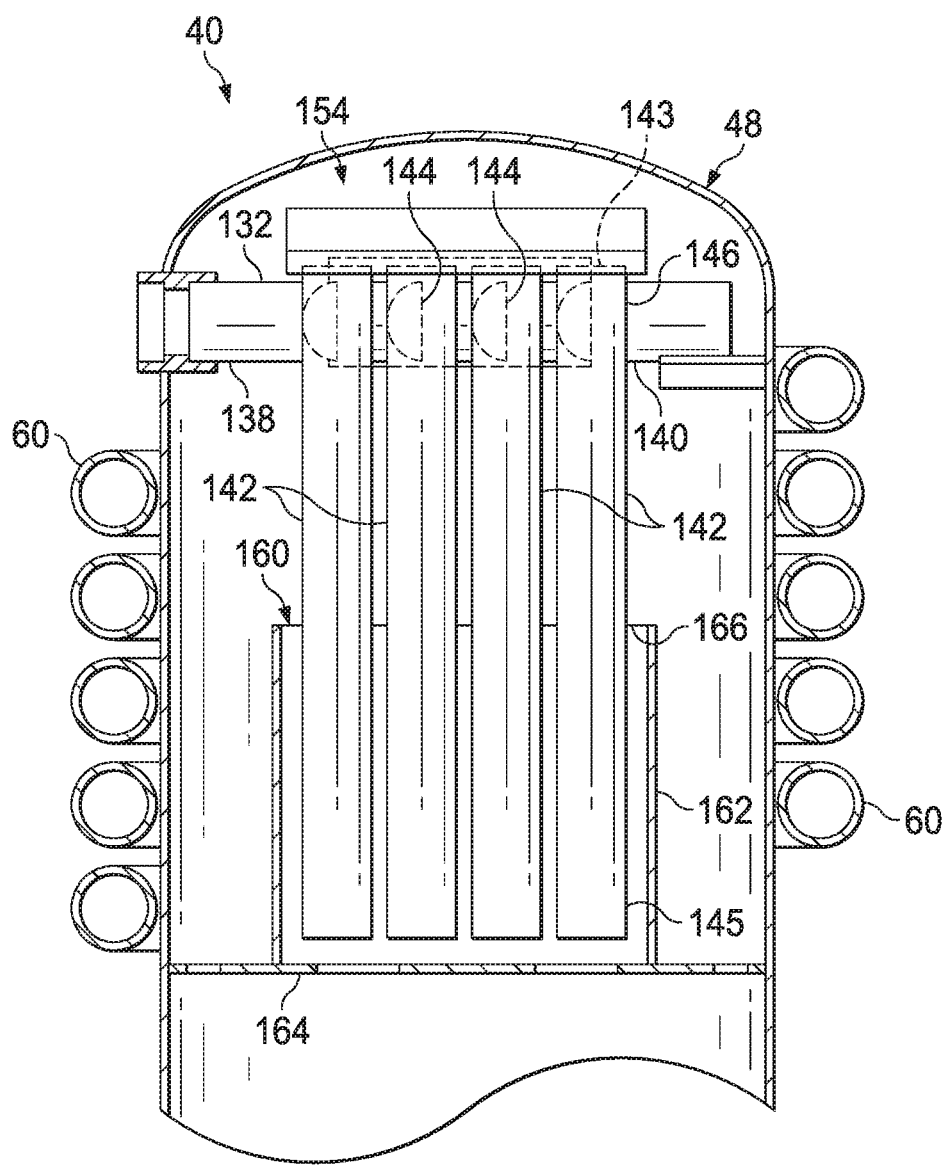
FIG. 8 is cut-away side view of another embodiment of a two-phase flow separator vessel with a with a linear vortex cluster system disposed therein.
Figure 9:
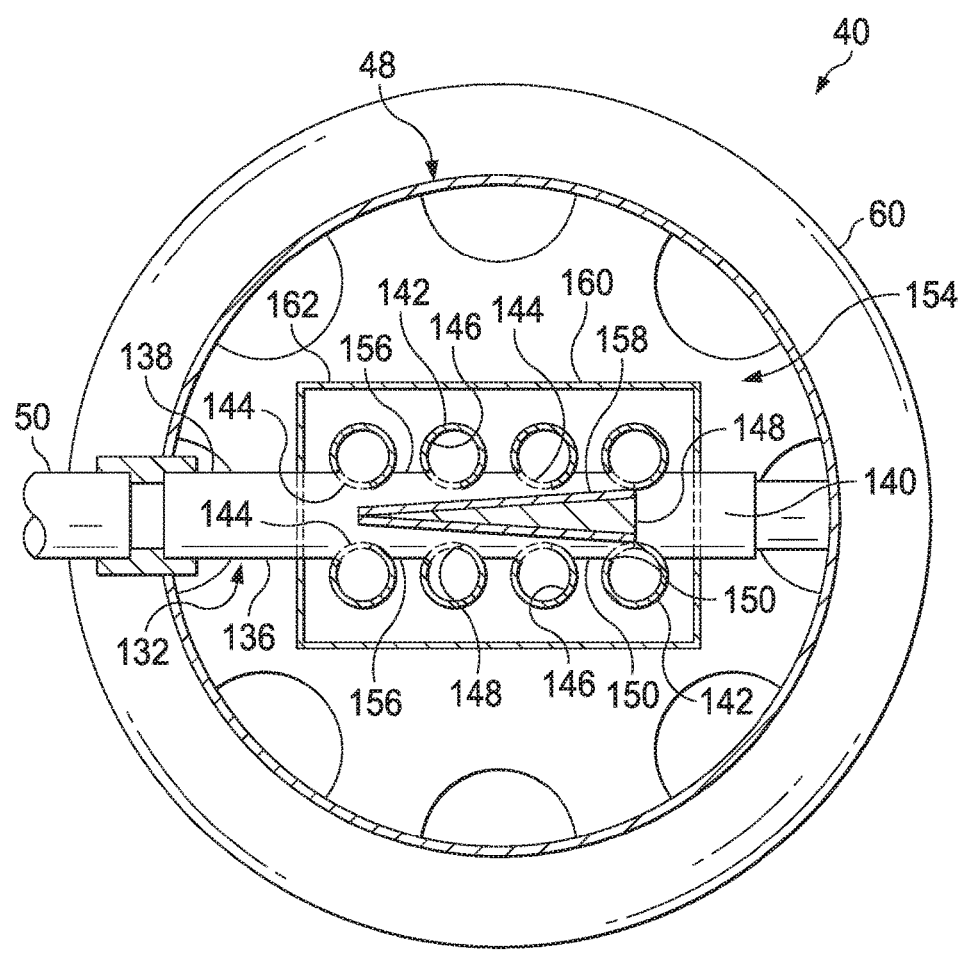
FIG. 9 is cut-away top view of another embodiment of a two-phase flow separator system of FIG. 8.

In FIGS. 8 and 9, another embodiment of a vortex cluster system 130 of FIG. 7 used in a two-phase flow separator system 40 is illustrated, wherein the vortex cluster system is a linear vortex cluster system 154. Linear vortex cluster system 154 is illustrated positioned within vessel 48 of the various two-phase flow separator systems described herein having a plurality of curvilinear pipe loops 60 positioned about the exterior of vessel 48. Fluid injection conduit 132 is substantially linear and forms a linear channel 136 with opposing sides 156 and having a first end 138 in fluid communication with riser 50 and a second end 140 terminating adjacent at least one vertically positioned vortex tube 142 extending down into vessel 48. In the illustrated embodiment, a plurality of vortex tubes 142 are spaced apart along conduit 132 so as to communicate with channel 136. Each vortex tube 142 has an opening 144 in a portion of the cylindrical, vertical sidewall 146 thereof so that opening 144 functions as an inlet with a leading edge 148 and a trailing edge 150. Where linear vortex cluster system 154 includes two or more vortex tubes 142, tubes 142 may be spaced apart along channel 136. Likewise, where linear vortex cluster system 154 includes two or more vortex tubes 142, tubes 142 may be positioned on opposing sides 156 of channel 136. The illustrated embodiment of FIGS. 8 and 9 illustrate eight vortex tubes 142 spaced apart along channel 136, with four vortex tubes 142 positioned on opposing sides of channel 136. In another embodiment, six vortex tubes 142 may be utilized, spaced apart from one another with three positioned on opposing channel sides. Other embodiments, may include fewer or more vortex tubes 142. In one or more embodiments, the cross-sectional area of channel 136 may gradually decrease along a portion of the length of channel 136 between ends 138, 140. This may be accomplished in some embodiments by positioning a gradually expanding wedge or tapered wall 158 or similar mechanism along channel 136 to promote flow of wet gas into the tube openings 96 of vortex tubes 142. While vortex tubes 142 are generally described as straight tubes, in other embodiments, vortex tubes 142 may be tapered to gradually narrow or gradually expand along the length of the tube 142.

In one or more embodiments as shown, a receptacle 160 may be provided into which vortex tubes 142 extend. Receptacle 160 includes a receptacle wall 162 and a receptacle base 164 spaced apart from the lower open end 166 of the vortex tubes 142. As liquid exits vortex tubes 142, the liquid will collect in receptacle 145 and eventually spill over the top edge 166 of receptacle 160, thereby further promoting separation of remaining gas that may be in fluid exiting tubes 142.

Thus, a hydraulic fracturing system has been described. The hydraulic fracturing system may include a liquid source, an additive source, a blender, a pump in fluid communication with the blender, and a two-phase flow separator system disposed inline between the blender and the high-pressure pump. In another embodiment, the hydraulic fracturing system may include a hydraulic fracturing blender having an outlet, a hydraulic fracturing pump having an inlet in fluid communication with the blender outlet, and a two-phase flow separator system disposed inline between the hydraulic fracturing blender outlet and the hydraulic fracturing pump inlet. In yet another embodiment, the hydraulic fracturing system may include a liquid source, an additive source, a blender, a pump in fluid communication with the blender, and a two-phase flow separator system disposed inline between the blender and the high-pressure pump, the two-phase flow separator system having a fluid vessel having a height H along a substantially vertical axis, an upper vessel portion and a lower vessel portion with a port in the upper portion and a port in the lower portion, the fluid vessel formed of a vessel wall so as to have an outer vessel diameter and an inner vessel diameter and define a vessel interior; a first pipe having a first end and a second end, the first pipe disposed about the vessel so as to form a plurality of descending curvilinear pipe loops arranged adjacent one another along the vertical axis, said pipe loops adjacent one another in a vertically stacked arrangement; and a riser having a first lower end in fluid communication with the first pipe adjacent the second end of the first pipe and the riser having a second upper end in fluid communication with the fluid vessel. In other embodiments, the hydraulic fracturing system may include a liquid source, a proppant source, a blender, a pump in fluid communication with the blender, and a two-phase flow separator system disposed inline between the blender and the high-pressure pump, the two-phase flow separator system having a fluid vessel having a height H along a substantially vertical axis, an upper vessel portion and a lower vessel portion with a port in the upper portion and a port in the lower portion, the fluid vessel formed of a vessel wall so as to have an outer vessel diameter and an inner vessel diameter and define a vessel interior; a first pipe having a first end and a second end, the first pipe disposed about the vessel so as to form a plurality of descending curvilinear pipe loops arranged adjacent one another along the vertical axis, said pipe loops adjacent one another in a vertically stacked arrangement; a vortex cluster system disposed within the fluid vessel; and a riser having a first lower end in fluid communication with the first pipe adjacent the second end of the first pipe and the riser having a second upper end in fluid communication with the vortex cluster system.

The following elements may be combined alone or in combination with any other elements for any of the foregoing embodiments:

A fluid distribution manifold disposed between the flow separator system and the pump.
The pump is a high-pressure pump.
A hydration unit in fluid communication with the blender.
The pump has an operating pressure of greater than 7000 psi.
The pump has an operating pressure of approximately 15,000 psi.
The pump has an operating pressure in the range of approximately 7000 psi to 15,000 psi.

The hydraulic fracturing pump is a high-pressure pump.

A plurality of blenders in fluid communication with the flow separator system.

A plurality of pumps in fluid communication with the flow separator system.

A fluid distribution manifold disposed in fluid communication with one or more blenders and a plurality of flow separator systems in fluid communication with the fluid distribution manifold.

The fluid distribution manifold includes a plurality of outlets, each manifold outlet in fluid communication with a pump, with a flow separator system fluidically coupled between each manifold outlet and the corresponding pump.

The two-phase flow separator system comprises a fluid vessel having a height H along a substantially vertical axis, an upper vessel portion and a lower vessel portion with a port in the upper portion and a port in the lower portion, the fluid vessel formed of a vessel wall so as to have an outer vessel diameter and an inner vessel diameter and define a vessel interior; a first pipe having a first end and a second end, the first pipe disposed about the vessel so as to form a plurality of descending curvilinear pipe loops arranged adjacent one another along the vertical axis, said pipe loops adjacent one another in a vertically stacked arrangement; a riser having a first lower end in fluid communication with the first pipe adjacent the second end of the first pipe and the riser having a second upper end in fluid communication with the fluid vessel.

The plurality of curvilinear pipe loops are in a vertically stacked arrangement so that each curvilinear pipe loop is substantially horizontal.

The plurality of curvilinear pipe loops each have an inner diameter that is larger than the vessel outer diameter and are in a vertically stacked arrangement about the fluid vessel so that each curvilinear pipe loop is substantially horizontal.

The plurality of curvilinear pipe loops extending along only a portion of the height H of the fluid vessel.

The plurality of vertically stacked pipe loops are spaced apart above the port in the lower portion of the fluid vessel.

The first pipe includes a substantially horizontal portion adjacent the second end of the first pipe with a liquid outlet at the second end of the first pipe and a gas outlet port disposed in an upper surface of the substantially horizontal portion, the first lower end of the substantially vertical riser in fluid communication with the gas outlet port.

The riser is substantially vertical.

A liquid flow line in fluid communication with the second end of the first pipe, the liquid flow line including a first outlet in fluid communication with the lower portion of the fluid vessel and a second outlet downstream of first outlet.

The liquid flow line passes under the fluid vessel such that the first outlet is in fluid communication with the lower portion of the fluid vessel via a liquid port formed in a lowest end of the fluid vessel.

A liquid flow line in fluid communication with the second end of the first pipe, the liquid flow line including an outlet and a backpressure device positioned along the liquid flowline between the second end of the first pipe and the liquid flow line outlet.

A backpressure device positioned along the liquid flowline upstream of the first outlet.

A vortex cluster system disposed within the interior of the fluid vessel and in fluid communication with the second upper end of the riser.

The riser and the vortex cluster system are in fluid communication with one another via the port in the upper vessel portion.

The vortex cluster system comprises a fluid injection conduit forming a channel having a first end in fluid communication with the riser and a second end adjacent at least one vertically positioned vortex tube extending down into said vessel, each vortex tube having a cylindrical, vertical sidewall portion with an opening in the sidewall, the opening adjacent the channel.

The channel extends from a first end to a second end, wherein the channel is linear between the first end and the second end.

The channel extends from a first end to a second end, wherein the channel tapers between the first end and the second end.

The channel is characterized by opposing sides with at least one vortex tube positioned along each opposing side of the channel.

The channel extends from a first end to a second end, wherein the cross-sectional area of the channel tapers between the first end and the second end.

The channel extends from a first end to a second end and is characterized by opposing sides, wherein the cross-sectional area of the channel tapers between the first end and the second end and at least one vortex tube is positioned along each opposing side of the channel.

At least six vortex tubes, with three vortex tubes positioned along each opposing side of the channel and spaced apart from one another along the length of the side.

The additive source is a chemical tank.

The additive source is a solid storage container.

The additive is proppant.

The additive is a chemical.

The additive is liquid.

Likewise, a method of hydraulic fracturing of a wellbore has been described. The hydraulic fracturing method may include introducing a fluid into a blender; introducing a proppant into a blender; utilizing the blender to mix the fluid with the proppant to produce a hydraulic fracturing fluid; directing the hydraulic fracturing fluid downward through a plurality of descending curvilinear loops to stratify the hydraulic fracturing fluid into a first fluid component comprising primarily a gas phase and a second fluid component comprising primarily a liquid phase; separating the first fluid component from the stratified hydraulic fracturing fluid; and directing the second fluid component into a hydraulic fracturing pump. The hydraulic fracturing method may include introducing a fluid into a blender; introducing an additive into a blender; utilizing the blender to mix the fluid with the additive to produce a hydraulic fracturing fluid; directing the hydraulic fracturing fluid downward through a plurality of descending curvilinear loops to stratify the hydraulic fracturing fluid into a first fluid component comprising primarily a gas phase and a second fluid component comprising primarily a liquid phase; separating the first fluid component from the stratified hydraulic fracturing fluid; and directing the second fluid component into a hydraulic fracturing pump. The hydraulic fracturing method may include introducing a fluid into a hydration unit; mixing the fluid with a chemical in the hydration unit; introducing the mixed fluid into a blender; introducing an additive into the blender;

utilizing the blender to mix the fluid with the additive to produce a hydraulic fracturing fluid; directing the hydraulic fracturing fluid downward through a plurality of descending curvilinear loops to stratify the hydraulic fracturing fluid into a first fluid component comprising primarily a gas phase and a second fluid component comprising primarily a liquid phase; separating the first fluid component from the stratified hydraulic fracturing fluid; and directing the second fluid component into a hydraulic fracturing pump. The hydraulic fracturing method may include utilizing a blender to prepare a hydraulic fracturing slurry; directing the hydraulic slurry into a hydraulic fracturing pump; and prior to directing the hydraulic slurry into a pump, removing air from the slurry prepared by the blender. The hydraulic fracturing method may include utilizing a hydration unit to prepare a hydraulic fracturing fluid; directing the hydraulic fracturing fluid into a hydraulic fracturing pump; and prior to directing the hydraulic fracturing fluid into a pump, removing air from the hydraulic fracturing fluid prepared by the hydration unit.

The following elements may be combined alone or in combination with any other elements for any of the foregoing method embodiments:

Directing the removed first fluid component into a vortex tube and separating the first fluid component into a third fluid component comprising primarily a liquid phase and a fourth fluid component comprising primarily a gas phase; and directing the third fluid component into a hydraulic fracturing pump.

Utilizing the hydraulic fracturing pump to inject the second fluid component into a wellbore.

Utilizing the hydraulic fracturing pump to inject the second fluid component and the third fluid component into a wellbore.

The additive is proppant.

The additive is a chemical.

The additive is liquid.

Mixing a fluid with an additive to produce a hydraulic fracturing fluid.

Mixing a fluid with a chemical to produce a hydraulic fracturing fluid.

Utilizing the hydraulic fracturing pump to pump the hydraulic fracturing fluid into a wellbore.

Utilizing a blender to blend a proppant into the hydraulic fracturing fluid prepared by the hydration unit.

Utilizing a hydration unit to prepare a hydraulic fracturing fluid prior to introduction into a blender.

Applying back pressure to the second fluid component to form a wave of liquid downstream of first fluid component separation to promote flow of the first fluid component away from the stratified two-phase fluid stream.

While various embodiments have been illustrated in detail, the disclosure is not limited to the embodiments shown. Modifications and adaptations of the above embodiments may occur to those skilled in the art. Such modifications and adaptations are in the spirit and scope of the disclosure.

What is claimed is:

1. A hydraulic fracturing system comprising: a liquid source, an additive source, a blender, a pump in fluid communication with the blender, and a gas-liquid two-phase flow separator system having a liquid outlet and a gas outlet, the gas-liquid two-phase flow separator system disposed inline between the blender and the pump.

2. The hydraulic fracturing system of claim 1, wherein the two-phase flow separator system comprises a fluid vessel having a height H along a substantially vertical axis, an upper vessel portion and a lower vessel portion with a port in the upper portion and a port in the lower portion, the fluid vessel formed of a vessel wall so as to have an outer vessel diameter and an inner vessel diameter and define a vessel interior;

a first pipe having a first end and a second end, the first pipe disposed about the vessel so as to form a plurality of descending curvilinear pipe loops arranged adjacent one another along the vertical axis, said pipe loops adjacent one another in a vertically stacked arrangement;

a riser having a first lower end in fluid communication with the first pipe adjacent the second end of the first pipe and the riser having a second upper end in fluid communication with the fluid vessel.

3. The hydraulic fracturing system of claim 2, wherein the plurality of curvilinear pipe loops each have an inner diameter that is larger than the vessel outer diameter and are in a vertically stacked arrangement about the fluid vessel so that each curvilinear pipe loop is substantially horizontal.

4. The hydraulic fracturing system of claim 2, wherein the first pipe includes a substantially horizontal portion adjacent the second end of the first pipe with a liquid outlet at the second end of the first pipe and a gas outlet port disposed in an upper surface of the substantially horizontal portion, the first lower end of the substantially vertical riser in fluid communication with the gas outlet port.

5. The hydraulic fracturing system of claim 2, further comprising a liquid flow line in fluid communication with the second end of the first pipe, the liquid flow line including a first outlet in fluid communication with the lower portion of the fluid vessel and a second outlet downstream of first outlet.

6. The hydraulic fracturing system of claim 5, further comprising a backpressure device positioned along the liquid flowline upstream of the first outlet.

7. The hydraulic fracturing system of claim 2, further comprising a vortex cluster system disposed within the interior of the fluid vessel and in fluid communication with the second upper end of the riser.

8. The hydraulic fracturing system of claim 7, wherein the vortex cluster system comprises a fluid injection conduit forming a channel having a first end in fluid communication with the riser and a second end adjacent at least one vertically positioned vortex tube extending down into said vessel, each vortex tube having a cylindrical, vertical sidewall portion with an opening in the sidewall, the opening adjacent the channel.

9. A hydraulic fracturing system comprising: a hydraulic fracturing blender having an outlet, a hydraulic fracturing pump having an inlet in fluid communication with the blender outlet, and a gas-liquid two-phase flow separator system having a liquid outlet and a gas outlet, the gas-liquid two-phase flow separator system disposed inline between the hydraulic fracturing blender outlet and the hydraulic fracturing pump inlet.

10. The hydraulic fracturing system of claim 9, wherein the two-phase flow separator system comprises a fluid vessel having a height H along a substantially vertical axis, an upper vessel portion and a lower vessel portion with a port in the upper portion and a port in the lower portion, the fluid vessel formed of a vessel wall so as to have an outer vessel diameter and an inner vessel diameter and define a vessel interior;

a first pipe having a first end and a second end, the first pipe disposed about the vessel so as to form a plurality of descending curvilinear pipe loops arranged adjacent one another along the vertical axis, said pipe loops adjacent one another in a vertically stacked arrangement;

a riser having a first lower end in fluid communication with the first pipe adjacent the second end of the first pipe and the riser having a second upper end in fluid communication with the fluid vessel.

11. The hydraulic fracturing system of claim 10, wherein the plurality of curvilinear pipe loops each have an inner diameter that is larger than the vessel outer diameter and are in a vertically stacked arrangement about the fluid vessel so that each curvilinear pipe loop is substantially horizontal.

12. The hydraulic fracturing system of claim 10, wherein the first pipe includes a substantially horizontal portion adjacent the second end of the first pipe with a liquid outlet at the second end of the first pipe and a gas outlet port disposed in an upper surface of the substantially horizontal portion, the first lower end of the substantially vertical riser in fluid communication with the gas outlet port.

13. The hydraulic fracturing system of claim 10, further comprising a liquid flow line in fluid communication with the second end of the first pipe, the liquid flow line including a first outlet in fluid communication with the lower portion of the fluid vessel and a second outlet downstream of first outlet.

14. The hydraulic fracturing system of claim 13, further comprising a backpressure device positioned along the liquid flowline upstream of the first outlet.

15. The hydraulic fracturing system of claim 10, further comprising a vortex cluster system disposed within the interior of the fluid vessel and in fluid communication with the second upper end of the riser.

16. The hydraulic fracturing system of claim 15, wherein the vortex cluster system comprises a fluid injection conduit forming a channel having a first end in fluid communication with the riser and a second end adjacent at least one vertically positioned vortex tube extending down into said vessel, each vortex tube having a cylindrical, vertical sidewall portion with an opening in the sidewall, the opening adjacent the channel.

17. A hydraulic fracturing system comprising: a liquid source, an additive source, a blender, a pump in fluid communication with the blender, and a two-phase flow separator system disposed inline between the blender and the high-pressure pump, the two-phase flow separator system comprising a fluid vessel having a height H along a substantially vertical axis, an upper vessel portion and a lower vessel portion with a port in the upper portion and a port in the lower portion, the fluid vessel formed of a vessel wall so as to have an outer vessel diameter and an inner vessel diameter and define a vessel interior; a first pipe having a first end and a second end, the first pipe disposed about the vessel so as to form a plurality of descending curvilinear pipe loops arranged adjacent one another along the vertical axis, said pipe loops adjacent one another in a vertically stacked arrangement; and a riser having a first lower end in fluid communication with the first pipe adjacent the second end of the first pipe and the riser having a second upper end in fluid communication with the fluid vessel.

18. The hydraulic fracturing system of claim 17, further comprising a liquid flow line in fluid communication with the second end of the first pipe, the liquid flow line including a first outlet in fluid communication with the lower portion of the fluid vessel and a second outlet downstream of first outlet.

19. The hydraulic fracturing system of claim 18, further comprising a backpressure device positioned along the liquid flowline upstream of the first outlet.

20. The hydraulic fracturing system of claim 17, further comprising a vortex cluster system disposed within the interior of the fluid vessel and in fluid communication with the second upper end of the riser.

21. The hydraulic fracturing system of claim 20, wherein the vortex cluster system comprises a fluid injection conduit forming a channel having a first end in fluid communication with the riser and a second end adjacent at least one vertically positioned vortex tube extending down into said vessel, each vortex tube having a cylindrical, vertical sidewall portion with an opening in the sidewall, the opening adjacent the channel.

22. The hydraulic fracturing system of claim 21, wherein vortex cluster system channel extends from a first end to a second end, wherein the channel is linear between the first end and the second end with a cross-sectional channel area that tapers between the first end and the second end, the channel characterized by opposing sides with at least one vortex tube positioned along each opposing side of the channel.

23. The hydraulic fracturing system of claim 17, further comprising a hydration unit in fluid communication with the blender.

24. The hydraulic fracturing system of claim 17, wherein the pump has an operating pressure of at least 7000 psi.

25. A method of hydraulic fracturing of a wellbore comprising:
introducing a fluid into a blender;
introducing an additive into a blender;
utilizing the blender to mix the fluid with the additive to produce a hydraulic fracturing fluid;
directing the hydraulic fracturing fluid downward through a plurality of descending curvilinear loops to stratify the hydraulic fracturing fluid into a first fluid component comprising primarily a gas phase and a second fluid component comprising primarily a liquid phase;
separating the first fluid component from the stratified hydraulic fracturing fluid; and
directing the second fluid component into a hydraulic fracturing pump.

26. The method of claim 25, further comprising directing the removed first fluid component into a vortex tube and separating the first fluid component into a third fluid component comprising primarily a liquid phase and a fourth fluid component comprising primarily a gas phase; and directing the third fluid component into a hydraulic fracturing pump.

27. The method of claim 25, further comprising utilizing the hydraulic fracturing pump to inject the second fluid component into a wellbore.

28. The method of claim 25, further comprising applying back pressure to the second fluid component to form a wave of liquid downstream of first fluid component separation to promote flow of the first fluid component away from the stratified two-phase fluid stream.

29. The method of claim 25, wherein the additive is a chemical.

30. The method of claim 25, wherein the additive is a proppant.

* * * * *